United States Patent
Bondarenko et al.

Patent Number: 5,921,200
Date of Patent: Jul. 13, 1999

[54] ANIMAL FEEDER WITH DISPENSING MECHANISM AND DUST COVER

[76] Inventors: Paul J. Bondarenko, 449 Dead End Rd., Lititz, Pa. 17543; Bryan S. Shive, 319 S. Cherry St., Myerstown, Pa. 17067; Leon S. Zimmerman, 254 Silverwood Dr.; George S. Zimmerman, 1020 Rabbit Hill Rd., both of Lititz, Pa. 17543

[21] Appl. No.: 09/007,284

[22] Filed: Jan. 14, 1998

Related U.S. Application Data

[60] Provisional application No. 60/046,048, May 9, 1997.

[51] Int. Cl.$^6$ .................................................... A01K 5/00
[52] U.S. Cl. .......................................... 119/52.1; 119/53
[58] Field of Search .......................... 119/52.1, 53, 53.5, 119/54, 56.1; D30/121, 128, 122

[56] References Cited

U.S. PATENT DOCUMENTS

| | | | |
|---|---|---|---|
| 3,811,412 | 5/1974 | Murto et al. | 119/53 |
| 4,200,060 | 4/1980 | Van Daele | 119/56 R |
| 4,348,988 | 9/1982 | Lawson | 119/53 |
| 4,911,727 | 3/1990 | King | 119/53 |
| 4,947,798 | 8/1990 | De Wispelaere | 119/53 |
| 5,007,380 | 4/1991 | Badia et al. | 119/53 |
| 5,010,849 | 4/1991 | Kleinsasser | 119/53 |
| 5,069,164 | 12/1991 | Wiwi | 119/53 |
| 5,092,274 | 3/1992 | Cole et al. | 119/57.4 |
| 5,230,301 | 7/1993 | Nass | 119/52.1 |
| 5,245,949 | 9/1993 | Hively | 119/53 |
| 5,558,039 | 9/1996 | Zimmreman | 119/52.1 |

*Primary Examiner*—Danton D. DeMille
*Assistant Examiner*—Yvonne R. Abbott
*Attorney, Agent, or Firm*—Mills Law Firm PLLC; Clifford F. Rey

[57] ABSTRACT

An improved livestock feeder for use with an automatic feed delivery system having a feed drop tube operatively connected thereto for dispensing feed into a feed bin is disclosed. The improved feeder is provided with an adjustable feed dispensing mechanism including control levers which are operatively connected to the feed metering gates to control the flow of feed to livestock. The dispensing mechanism features a plurality of adjustable control levers which engage an array of indexing holes formed in the feeder to set the vertical height adjustment of the feed gates. The dispensing mechanism includes a graduated scale corresponding to each of the index holes to provide a standard setting for the feeder which can be utilized by an animal producer to supply of feed flow at a given stage in the animal's life cycle to obtain a desired growth rate. In a production facility where several of the feeders are in use a standard setting for the release of feed may be obtained to reduce variations in animal growth rate. The feeder is also provided with a removable dust cover which is installed within the feed bin to reduce airborne particles generated by the automatic feed delivery system.

8 Claims, 7 Drawing Sheets

ANIMAL FEEDER WITH DISPENSING MECHANISM AND DUST COVER

CROSS REFERENCE TO RELATED APPLICATION

This Application claims the benefit under 35 U.S.C. 119(e) of United States Provisional Application No. 60/046,048 filed May 9, 1997 by Paul J. Bondarenko, Bryan S. Shive, Leon S. Zimmerman, and George S. Zimmerman for Animal Feeder with Dispensing Indicia and Dust Cover.

BACKGROUND OF INVENTION

1. Field of Invention

This invention relates to animal feed dispensers and, more particularly, to an improved animal feeder having an adjustable feed dispensing mechanism.

All conventional gravity type feeders utilize so-called feed gates to regulate the flow of feed from a hopper to the animals. These feed gates are usually adjusted by some type of threaded adjusting mechanism to control the flow of feed. The threaded adjusting mechanisms found in hog feeders on the market today offer no means of accurately determining the flow of feed being dispensed. If the gate is open too much, more feed will be dispensed than the animals can eat and the excess feed is wasted. On the other hand if the gate is not open enough, the animals will not get the amount of food necessary for optimum growth. To compound the matter, as the animals grow larger, they need more food to continue optimal growth.

To adjust conventional feeders correctly to obtain optimum performance requires a certain amount of guesswork. Because adjusting the feeders is difficult and very labor intensive, many feeders are simply not adjusted properly, resulting in feed waste or poor animal growth rate as discussed above.

The present invention solves this problem by providing an improved feeder having a precise feed dispensing mechanism with standardized indicia to eliminate the guesswork from dispensing feed to the livestock.

The advantages provided by the present invention are that animal producers can control proper feed adjustment based on animal weight, feed type, number of animals, etc. Producers can also mandate a standard setting for all feeders for any given circumstance thereby ruling out potential variables in animal production.

Another advantage to the present invention is that routine adjustments to the feed dispensing mechanism can be accomplished simply and the feed gates can be quickly and fully opened for cleaning.

The dispensing mechanism of the present invention is user friendly, the index scale of 1 to 10 is easily read and understood, a direct acting index lever correlates to feed gate movements either upwardly or downwardly, the indexing lever and connecting rods are replaceable and the unique connecting rod attaches to the feed gate without bolts or welding.

A dust cover is included which makes the feeder of the present invention environmentally safe by preventing large amounts of dust from becoming airborne when a feeder is being filled by an automatic delivery system.

In addition to the above, the improved feeder of the present invention includes a feed drop tube holder similar to that shown in U.S. Pat. No. 5,558,039 to adapt it for use with an automatic feed delivery system.

2. Description of Related Prior Art

U.S. Pat. No. 5,558,039 to Leon S. Zimmerman discloses a livestock feeder for use with an automatic feed delivery system having a feed drop tube operatively connected thereto for dispensing feed into a feed bin. This feeder features a feed drop tube holder fabricated from a flexible, resilient material which is installed intermediate the opposed side walls of the feed bin by compressing the holder lengthwise with hand pressure to effectively reduce its overall length and to allow tabs formed on the ends thereof to engage a plurality of horizontally opposed slots formed in the opposed side walls.

SUMMARY OF THE INVENTION

After much research and study of the above described problems, the present invention has been developed to provide an improved livestock feeder including a feed dispensing mechanism which accurately controls the flow of feed to the animals for consumption. The improved feeder utilizes a pair of adjustable feed gates installed in the lower portion of a gravity feed bin formed by downwardly converging side walls. The feed gates are mechanically coupled by connecting rods to the feed dispensing controls which are accessible from the open top of the feed bin.

The controls for the feed dispensing mechanism are provided with a lever that engages a standard index of positions that adjust the opening of the feed gates. By use of the controls, animal producers may obtain a standardized setting for the release of feed to animals at different stages of the life cycle to obtain optimum growth rates.

In the preferred embodiment, the dispensing mechanism and controls are utilized with a hog feeder of the type disclosed in U.S. Pat. No. 5,558,039 which has previously issued to the Applicant herein.

In view of the above, it is an object of the present invention to provide an improved livestock feeder having a precision dispensing mechanism that will accurately control the release of feed to livestock.

Another object of the present invention is to provide an improved livestock feeder that will permit animal producers to obtain standardized settings for the release of feed to numerous animals at a particular stage in the production cycle.

Another object of the present invention is to provide an improved livestock feeder that will reduce variations in growth rate between animals by insuring the controlled release of food thereto.

Another object of the present invention is to provide an improved livestock feeder including a removable dust cover which is installed across the top opening of the feeder to reduce the release of airborne dust generated by an automatic feed delivery system.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
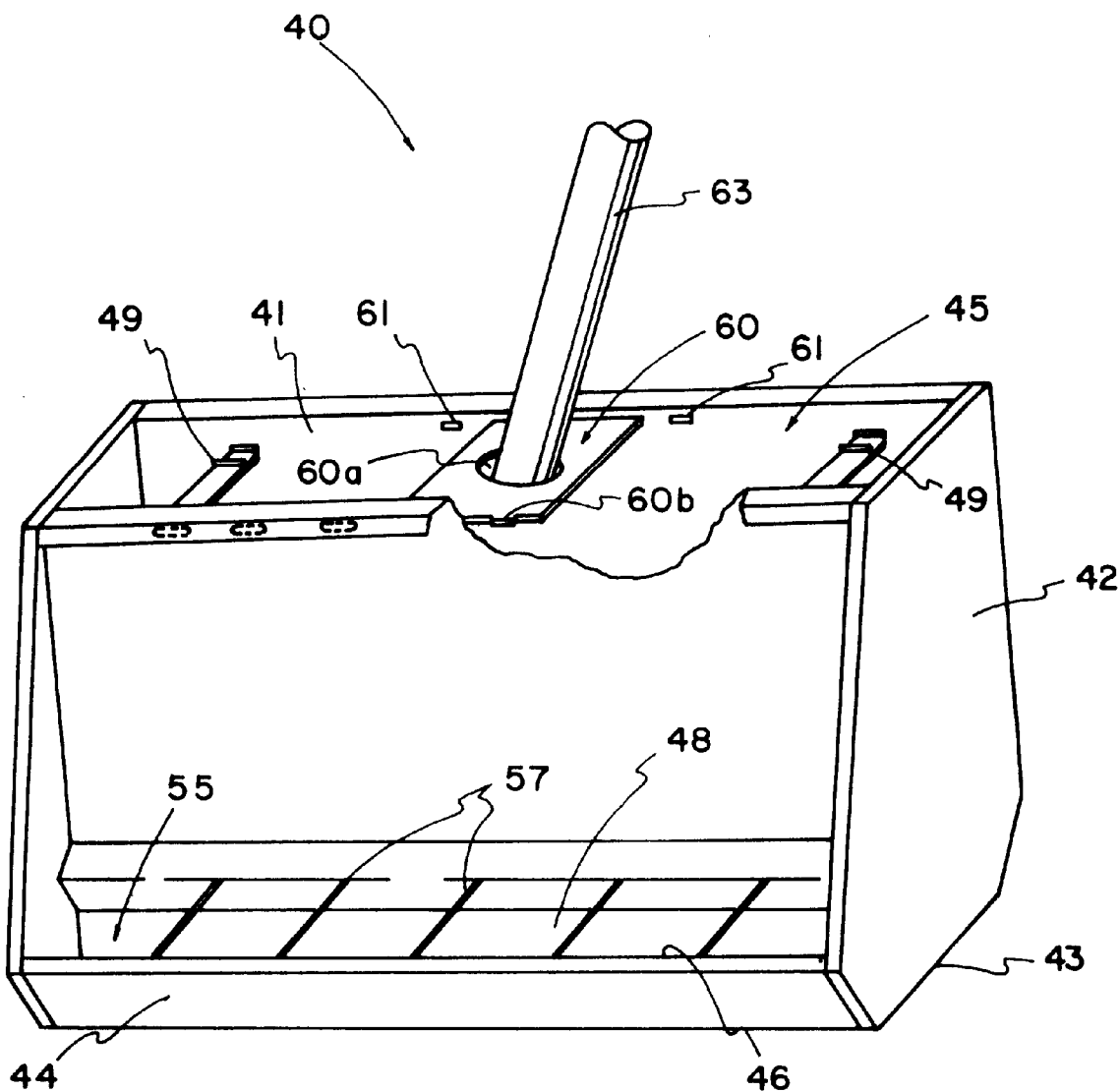
FIG. 1 is a perspective view of a livestock feeder of the prior art.

As background and to better understand by comparison the improved livestock feeder of the present invention, reference should be made to animal feeder illustrated in FIG. 1 and labeled Prior Art.

The Prior Art animal feeder, indicated generally at 40, comprises an open-topped hopper, indicated generally at 45, defined by opposing, downwardly sloping side walls 41 and opposing substantially vertical end walls 42.

The opposing end walls 42 are of generally rectangular shape and their upper edges are preferably positioned on substantially the same level as the upper edges of the downwardly sloping side walls 41. The lower edges of the opposing end walls 42 terminate at a substantial distance below the lower edges of the opposing side walls 41 and are suitably secured to opposed ends of a bottom wall 43.

The bottom wall 43 is connected to upwardly and outwardly inclined outer panel portions 44 forming elongate feed troughs, indicated generally at 55, along opposite sides of the animal feeder 40 and below the opposing side walls 41.

The lower portions of the downwardly converging side walls 41 and the bottom wall 43 define therebetween a feed discharge opening 16.

As another element of the Prior Art feeder 40, reinforcing dividers, shown in the form of plurality of spaced-apart, elongate rods 57 span the feed troughs 55 from the side walls 41 to the respective outer trough portions 44 of the bottom wall 43. The rods 57 reinforce the feed bin and divide each feed trough 55 into individual feeding areas which serve to aid in giving the livestock animals access to feed.

As another element of the Prior Art feeder 40, a pair of elongate, pivotally mounted, vertically adjustable gates 48 including gate adjustment means 49 mechanically coupled thereto overlie the respective feed discharge openings 46 for varying the size of each opening 46. The gates 48 extend longitudinally between the end walls 42 with the opposite ends of the gates 48 terminating closely adjacent end walls 42. A small clearance remains necessary between the ends of the gates 48 and the end walls 42 so that the gates 48 may pivot freely in their described adjusted positions.

Another element of the Prior Art feeder 40 is the feed drop tube holder, indicated generally at 60, as shown in FIG. 1. The feed drop tube holder 60 is a generally flat, rectangular structure having a circular opening 60a in the center thereof.

Holder 60 includes a plurality of tabs 60b integrally formed on opposite ends thereof at predetermined intervals. Tabs 60b are adapted to engage a plurality of cooperating slots 61 which are disposed about the upper peripheral edges of side walls 41 at regular intervals.

One of the principle advantages of the feed drop tube holder 60 is that it does not require brackets for additional hardware to install. Holder 60 is manufactured to an overall length that is slightly larger than the inside dimension between the opposing side walls 41 as measured in a plane coincidental with slots 61.

Being made of a flexible, resilient material holder 60 may be compressed lengthwise by hand pressure into a curved bow shape in order to insert tab 60b into cooperating slot 61.

Once released from this position, holder 60 springs back into its original flat configuration such that tabs 60b project outwardly through slots 61 in side walls 41 retaining holder 60 therebetween.

The central opening 60a in holder 60 is sized to a dimension that is slightly larger than the feed drop tube 63 to accommodate the insertion of the same into central openings 60a at varying angles without binding therein.

It will be appreciated by those skilled in the art that holder 60 may be easily repositioned to several longitudinal positions within feeder 40 by removing and replacing holder 60 to a different grouping of opposed slots 61 as desired.

Since all of the above hereinabove described features of feeder 40 are well known to those skilled in the art, further detailed discussion of the same is not deemed necessary.

Figure 2:
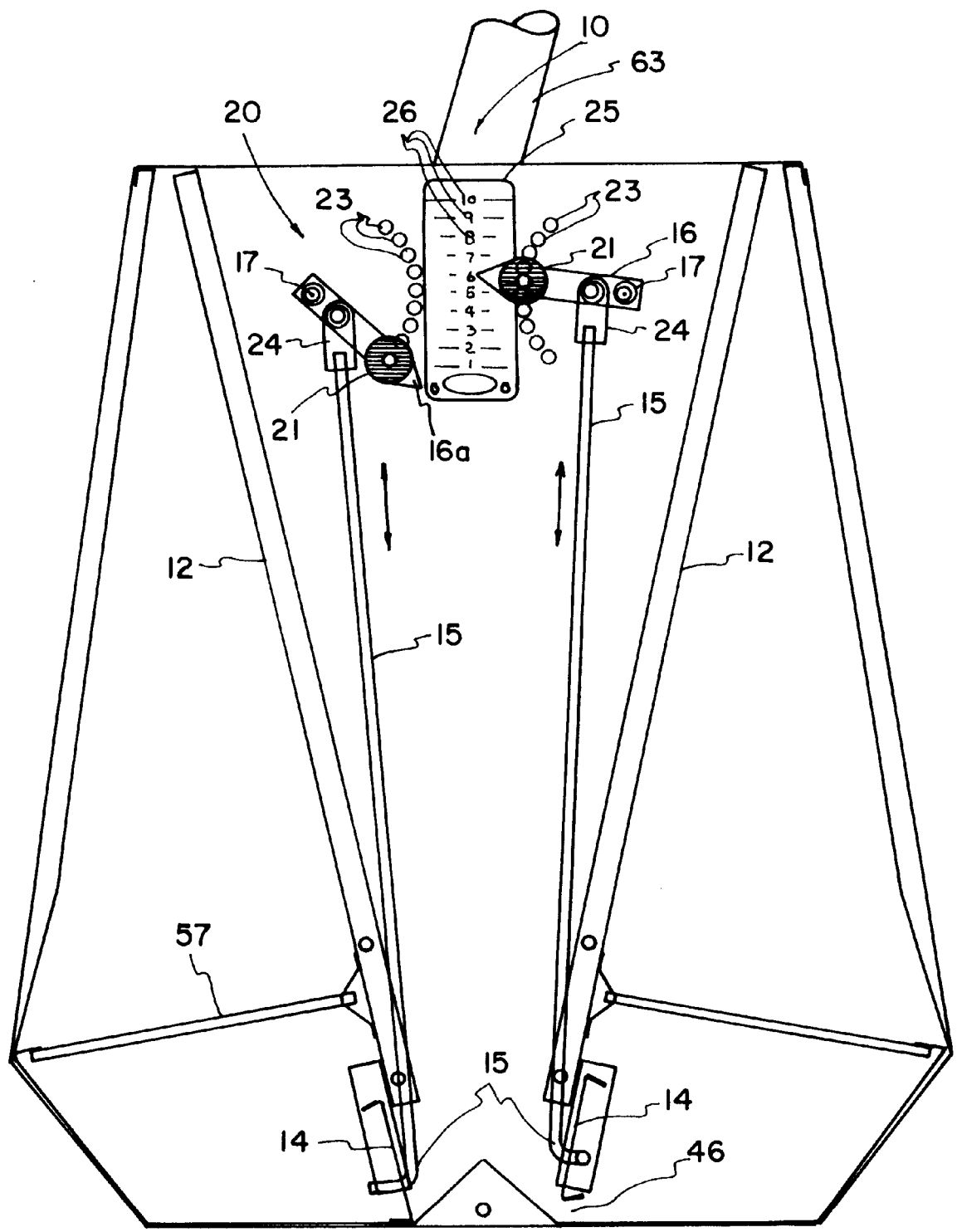
FIG. 2 is a cross-sectional view of the improved feeder of the present invention showing the feed-dispensing mechanism thereof.

One of the principle improvements of the animal feeder 10 of the present invention is the feed dispensing mechanism, indicated generally at 20 comprising a pair of control levers 16 with associated indexing holes 23, a scale 25 with numeric indicia 26, control rods 15 and feed gates 14 as shown in FIG. 2.

The structure and function of these components will now be described in further detail. It will be understood that a dispensing mechanism as depicted in FIG. 2 is installed on the interior surface of each end wall 11 of the present feeder 10 to operate the vertically adjustable feed gates 14 thereof.

Figure 3:
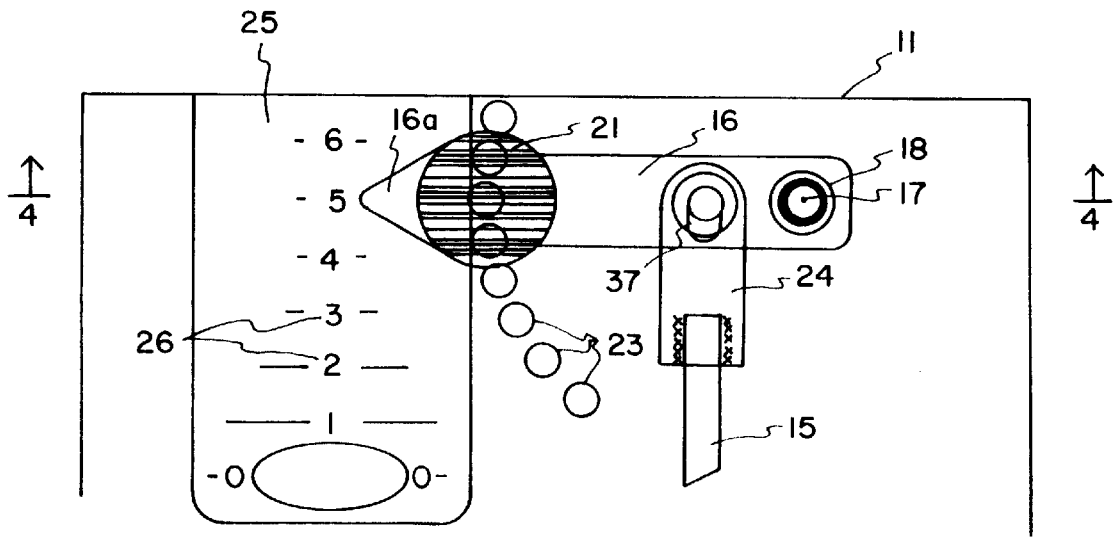
FIG. 3 is an enlarged view of the feed dispensing controls.
Figure 4:
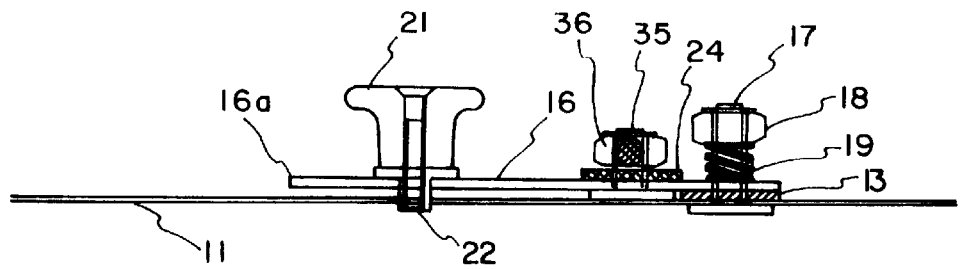
FIG. 4 is a sectional view taken through section 4—4 of FIG. 3.

A pair of adjustable control levers 16 are pivotally mounted on the interior surface of each end wall 11 by use of suitable attaching hardware such as a pivot screw 17, lock washer 18, spacer 13 and compression spring 19 as seen in FIGS. 3 and 4.

An opposite end of the control lever 16 includes a pointer 16a for indicating the setting for the feed gates 14 as described hereinafter in further detail.

The pointer 16a is provided with a knob 21 including an index pin 22 projecting outwardly therefrom for mating engagement with an array of index holes 23 which are radially disposed at regular intervals along an arc concentric with an axis of the pivot screw 17 as seen in FIGS. 3 and 4.

Intermediate the pivot screw 17 and the knob 21 an upper end of a connecting rod 15 is secured using suitable attaching hardware. In the preferred embodiment a connecting tab 24 having an elongated slot 37 formed at one end thereof is coupled to the upper end of connecting rod 15. The tab 24 is mounted on a connecting bolt 35 which loosely penetrates the slot 37 and is secured thereon by lock nut 36.

Figure 5:
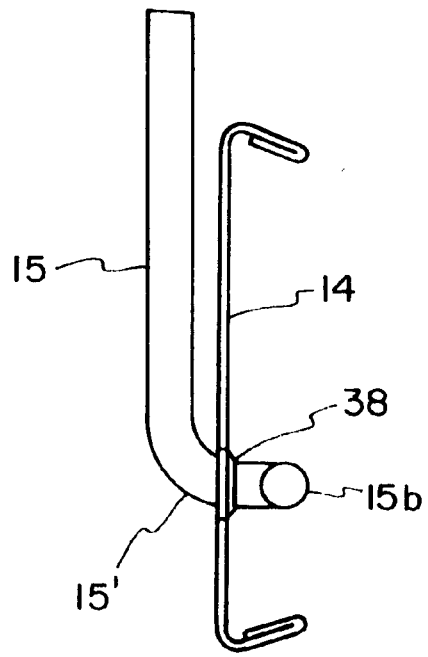
FIG. 5 is a cross-sectional view of the feed gate showing the manner in which the connecting rod is attached thereto.
Figure 6:
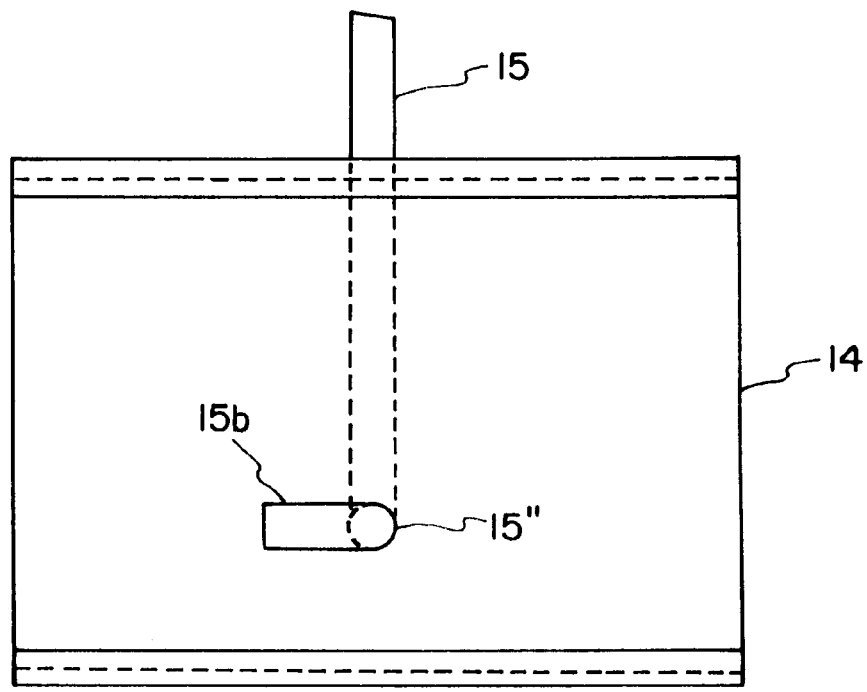
FIG. 6 is a side elevational view of the connecting rod and feed gate.
Figure 7:
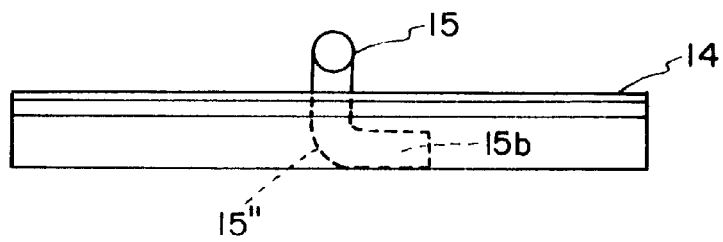
FIG. 7 is a top sectional view of the lower portion of a connecting rod.

An opposite end of each connector rod 15 is configured as illustrated in FIGS. 5–7. The lower most end of the connector rod 15 is initially bent at 90° to a longitudinal axis thereof as at 15' in FIG. 5 so as to lie in a plane coincident with the major portion of the rod 15. Thereafter the tip portion 15b is again bent 90° as at 15" to lie in a plane perpendicular to the longitudinal axis of the major portion of the rod 15 as shown in FIG. 6.

To install the connector rod 15 in the feed gate 14 the tip portion 15b is inserted through mounting aperture 38 as seen in FIG. 5 attaching the rod 15 to the feed gate 14 without bolting or welding the connection. Thus installed, it will be appreciated that a non-binding linkage is provided between the rod 15 and the gate 14 to facilitate operation of the dispensing mechanism when the feeder is filled to capacity.

Figure 8:
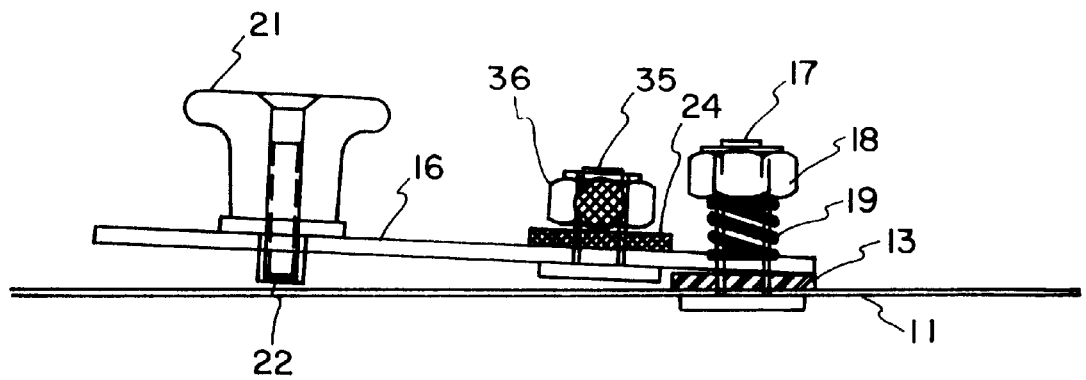
FIG. 8 is a sectional view showing the control lever in a position of disengagement with an indexing hole.
Figure 9:
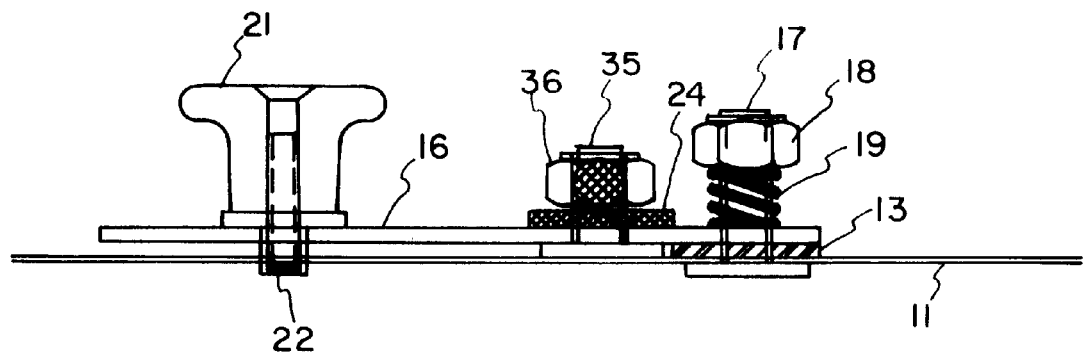
FIG. 9 is a sectional view showing the control lever in a position of engagement with an indexing hole.

In normal operation the user of the improved feeder 10 adjusts the dispensing mechanism 20 by grasping and pulling the knob 21 outwardly from an engaged position as shown in FIG. 8 and pivoting the lever 16 upwardly or downwardly to adjust the gate 14 to the desired vertical position. After the desired position or hole 23 is selected, the knob 21 is again released to the position shown in FIG. 9.

It will be appreciated that each respective indexing hole 23 corresponds to numeric indicia 26 on the scale 25 so as to dispense feed at a predetermined rate to livestock eating from the feeder 10. In this manner several feeders 10 can be utilized in a livestock production facility to deliver a predetermined amount of feed to animals at any stage of the life cycle using the standard settings on the scale 25.

It will also be noted that a feeder 10 can be disposed between adjacent pens in such a production facility and adjusted to deliver feed in different amounts from opposite sides of the feeder 10. Thus, the improved feeder of the present invention provides significant advantages to animal producers which are unknown in the prior art.

Figure 10:
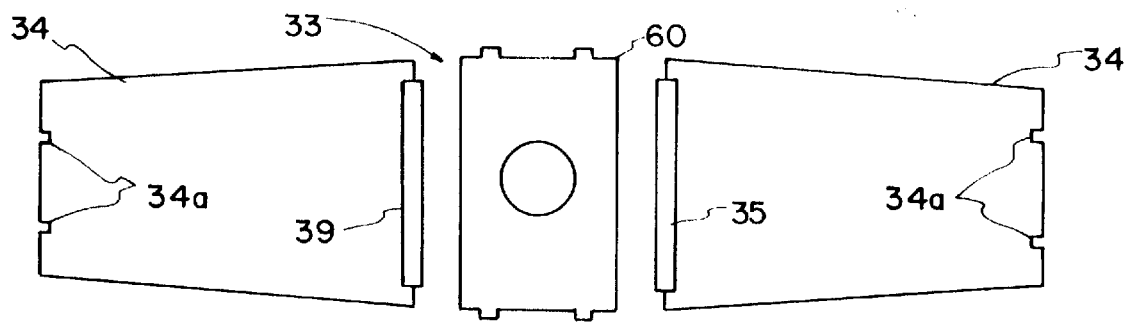
FIG. 10 is a top plan view of the dust cover panels.

Further, the physical location of the dispensing mechanisms 20 on the interior end walls 11 of the feeder rather than on lateral brace members 47 extending across the hopper 45 as shown in FIG. 1 lends itself to another principle advantage of the present invention. The improved feeder 10 is provided with a removable dust cover, indicated generally at 33 as shown in FIGS. 10–12.

Figure 11:
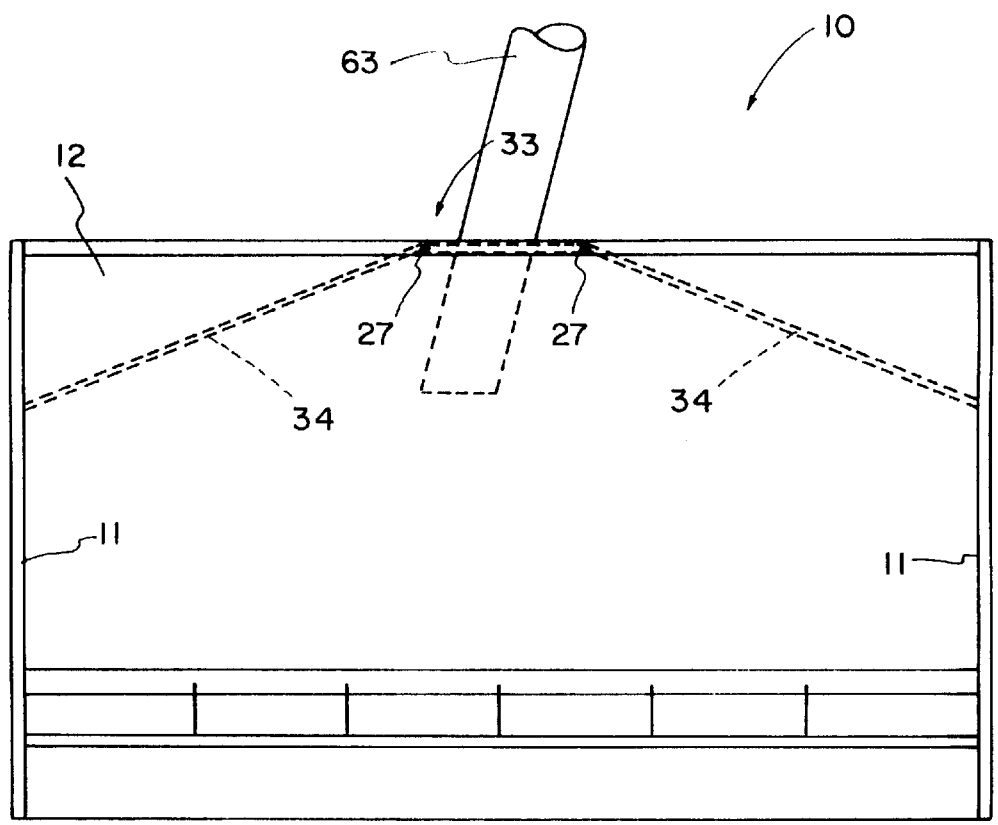
FIG. 11 is an elevational view of the animal feeder showing the dust cover installed therein.
Figure 12:
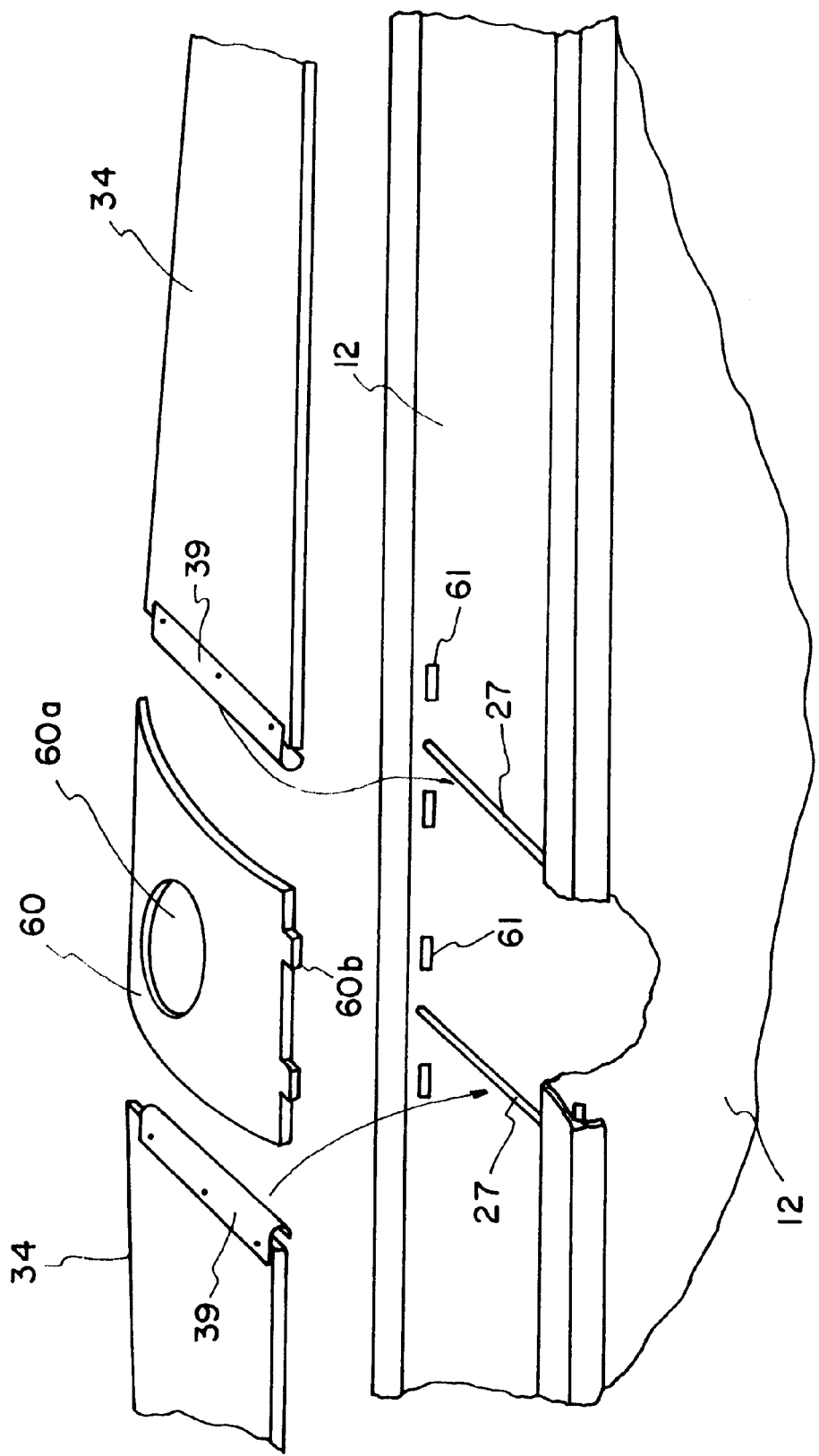
FIG. 12 is an enlarged view showing the support braces and J-shaped brackets for mounting the dust cover panels.

The dust cover 33 is comprised of a pair of generally rectangular panels 34 which are configured and dimensioned to closely fit the interior peripheral edge of the feeder 10 when installed therein as shown in FIG. 11. It will be understood that the feed drop tube holder 60 of the prior art as shown in FIG. 10 functions as a part of the dust cover 33 as described hereinafter in further detail.

The dust cover panels 34 together with the feed drop tube holder 60 are fabricated from a resilient plastic material and are easily removed for cleaning and maintenance purposes.

The dust cover panels 34 are supported in the position shown in FIG. 11 by a pair of generally parallel support braces 27 which extend transversely across the top opening of the feeder 10 interconnecting the downwardly sloping side walls 12.

Braces 27 are configured to support the inner edges of the panels 34 in the position shown in FIG. 11. In the preferred embodiment the inner edges of the dust cover panels 34 are provided with attaching hardware such as J-shaped brackets 39 which are secured to the inner edges of panels 34 by suitable fasteners. J-shaped brackets 39 engage the support braces to 27 to secure the panels 34 as more clearly shown in FIG. 12.

An opposite end portion of the panels 34 are provided with cut-out portions 34a to accommodate the connecting rods 15 disposed along the end walls 11 of the feeder. The insertion of the feed drop tube holder 28 is accomplished as described hereinabove and in U.S. Pat. No. 5,558,039.

It will be appreciated by those skilled in the art that the remaining peripheral edges of the panels 34 are supported by their contact with the downwardly and inwardly converging side walls 12 of the feeder.

In this construction the dust cover 33 functions to reduce the airborne particulates generated by the automatic feed delivery system utilized in conjunction with feeders of this type. Thus, the environment of the production facility is made safer and respiratory hazards are reduced for both man and animal.

From the above it can be seen that the improved animal feeder of the present invention provides an adjustable dispensing mechanism for the accurate delivery of feed to livestock animals. The dispensing mechanism includes standardized controls and settings to enable a precise amount of feed to be delivered to animals during specific stages of their life cycle to ensure optimum growth rates.

The improved feeder of the present invention also provides a dust cover for controlling airborne particulate matter created by the automatic feed delivery system used in conjunction with the feeder.

The terms "top", "bottom", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. An improved animal feeder for use with an automatic feed delivery system having a feed drop tube operatively connected thereto, said feeder including a feed bin defined by a pair of opposed, downwardly converging side walls, a pair of opposed end walls fixedly attached to said side walls, and a bottom wall fixedly attached at the lower edges of said side walls and said end walls forming elongated troughs along opposite sides of said feeder and below said opposed side walls, a pair of vertically adjustable feed gates disposed intermediate said lower edges of said side walls and in adjustable space apart relation to said bottom wall to control the flow of feed into said troughs, the improvement comprising:

an adjustable feed dispensing means including control lever means having indexing means, said control lever means being pivotally mounted on said feed bin;

connecting rod means operatingly connected to said control lever means, said connecting rod means being attached to said feed gates at a near opposite end thereof such that said indexing means is moved upwardly or downwardly to accurately adjust the vertical height of said feed gates.

2. The improved animal feeder of claim 1 wherein said dispensing mechanism includes a graduated scale having indicia thereon corresponding to indexing means to indicate the setting for said feed dispensing means.

3. The improved animal feeder of claim 2 wherein said indicia correspond to different positions ranging from a fully closed to fully open position of the said feed gates.

4. The improved animal feeder of claim 1 wherein the control lever means include a pointer formed at an end thereof.

5. The improved animal feeder of claim 1 wherein a lower end of each of said connector rod means is initially bent at approximately 90° relative to a longitudinal axis thereof to form a first bend portion and simultaneously also bent at approximately 90° laterally to form a second bent portion to engage an opening formed in said feed gate to provide a movable, non-binding connection such that said feed gate is permanently captured thereon.

6. The improved animal feeder of claim 1 wherein a dust covering means is installed within said feed bin adjacent a top opening thereof to reduce airborne particulate matter released from said feeder.

7. The improved animal feeder of claim 6 wherein said dust cover includes at least one generally rectangular panel which functions in cooperation with a feed drop tube holder to contain said airborne particulate matter.

8. The improved animal feeder of claim 7 wherein said panel is configured to closely conform to an interior periphery of said feed bin.

* * * * *